United States Patent
Brown

(10) Patent No.: US 6,282,405 B1
(45) Date of Patent: Aug. 28, 2001

(54) HYBRID ELECTRICITY AND TELECOMMUNICATIONS DISTRIBUTION NETWORK

(75) Inventor: Paul A. Brown, Kendal (GB)

(73) Assignee: Norweb Plc, Manchester (GB)

( * ) Notice: Subject to any disclaimer, the term of this patent is extended or adjusted under 35 U.S.C. 154(b) by 0 days.

(21) Appl. No.: 08/727,505

(22) PCT Filed: Apr. 20, 1995

(86) PCT No.: PCT/GB95/00893

§ 371 Date: Jan. 17, 1997

§ 102(e) Date: Jan. 17, 1997

(87) PCT Pub. No.: WO95/29536

PCT Pub. Date: Nov. 2, 1995

Related U.S. Application Data

(63) Continuation-in-part of application No. 08/347,427, filed on Nov. 29, 1994, now Pat. No. 5,684,450.

(30) Foreign Application Priority Data

Oct. 22, 1992 (GB) .................................................. 9222205
Apr. 21, 1994 (GB) .................................................. 9407935

(51) Int. Cl.[7] .................................................. H04N 7/16
(52) U.S. Cl. .......................... 455/6.1; 340/310.06; 348/6
(58) Field of Search ............................. 455/3.3; 375/359, 375/257; 340/531, 310.06, 310.01, 310.02; H04N 7/16, 7/10, 7/173

(56) References Cited

U.S. PATENT DOCUMENTS

| 1,547,242 | 7/1925 | Strieby . |
| 2,577,731 | 12/1951 | Berger . |
| 3,696,383 | 10/1972 | Oishi et al. ............................. 340/310 |
| 3,846,638 | 11/1974 | Wetherell .................................. 307/3 |
| 3,942,170 | 3/1976 | Whyte ................................ 340/310 A |
| 3,993,989 | 11/1976 | Held et al. ......................... 340/310 R |

(List continued on next page.)

FOREIGN PATENT DOCUMENTS

| 0141673 | 5/1985 | (EP) ................................ H04B/3/56 |
| 2326087 | 4/1977 | (FR) ................................ H04B/3/54 |

(List continued on next page.)

OTHER PUBLICATIONS

J. Gohari, "Power–Line Carrier," *Fundamentals Handbook of Electrical and Computer Engineering, vol. II, Communication, Control. Devices, and Systems*, (Sheldon S. L. Chang, editor), John Wiley & Sons, New York, 1983, pp. 617–627.

Keith Nichols, "Build A Pair Of Line Carrier Modems," *Radio Electronics*, Jul. 1988, pp. 87–91.

Informal English translation of French Application No. 7621599 corresponding to French Patent 2,326,087 (Zellweger Uster S.A.).

(List continued on next page.)

*Primary Examiner*—Chris Grant
(74) *Attorney, Agent, or Firm*—Howrey Simon Arnold & White LLP

(57) ABSTRACT

A telecommunications network for linking a plurality of premises, comprising, typically, a fiber optic or coaxial cable, and a plurality of electrical power cables each connected to a respective one of the premises for supplying mains electrical power thereto. Each of the power cables is also connected to the fiber optic or coaxial cable so that telecommunications signals are transmissible between the fiber optic or coaxial cable and each of the power cables. A telecommunications signal is transmissible to the plurality of premises by being transmitted along the fiber optic or coaxial cable and subsequently along the respective power cable of each of the premises.

19 Claims, 13 Drawing Sheets

U.S. PATENT DOCUMENTS

| | | | |
|---|---|---|---|
| 4,142,178 | 2/1979 | Whyte et al. | 340/310 R |
| 4,359,644 | 11/1982 | Foord | 307/40 |
| 4,367,522 | 1/1983 | Forstbauer et al. | 363/137 |
| 4,383,243 | 5/1983 | Krügel et al. | 340/310 |
| 4,409,542 | 10/1983 | Becker et al. | 324/57 |
| 4,419,621 | 12/1983 | Becker et al. | 324/51 |
| 4,471,399 | 9/1984 | Udren | 361/64 |
| 4,475,209 | 10/1984 | Udren | 375/4 |
| 4,479,033 | 10/1984 | Brown et al. | 179/2.51 |
| 4,517,548 | 5/1985 | Ise et al. | 340/310 R |
| 4,701,945 | 10/1987 | Pedigo | 379/66 |
| 4,766,414 | 8/1988 | Shuey | 340/310 A |
| 4,772,870 | 9/1988 | Reyes | 340/310 |
| 4,912,553 | 3/1990 | Pal et al. | 358/86 |
| 5,066,939 | 11/1991 | Mansfield | 340/310 R |
| 5,068,890 | 11/1991 | Nilssen | 379/90 |
| 5,148,144 | 9/1992 | Sutterlin et al. | 340/310 A |
| 5,319,634 | 6/1994 | Bartholomew et al. | 370/18 |
| 5,406,249 | 4/1995 | Pettus | 340/310.08 |
| 5,477,091 | 12/1995 | Fiorina et al. | 307/66 |
| 5,497,142 | 3/1996 | Chaffanjon | 340/310.06 |
| 5,559,377 | 9/1996 | Abraham | 379/66 |
| 5,684,450 | 11/1997 | Brown | 340/310.02 |
| 5,717,685 | 2/1998 | Abraham | 370/30 |

FOREIGN PATENT DOCUMENTS

| | | | |
|---|---|---|---|
| 1548652 | 7/1979 | (GB) | H04B/3/54 |
| 2101857 | 1/1993 | (GB) | H04B/3/56 |
| 2272350 | 5/1994 | (GB) | H04B/3/56 |
| WO84/01481 | 4/1984 | (WO) | H04B/3/54 |
| WO90/13950 | 11/1990 | (WO) | H04B/1/50 |
| WO92/16920 | 10/1992 | (WO) | H04B/3/54 |
| WO93/07693 | 4/1993 | (WO) | H04J/13/00 |
| WO 93/23928 | 11/1993 | (WO) | H04B/1/38 |
| WO 94/09572 | 4/1994 | (WO) | H04B/3/54 |

OTHER PUBLICATIONS

JP62120735, Patent Abstracts of Japan, vol. 11 No. 341 (E–554) June 2, 1987, Kaoru et al., Method and Apparatus for Frequency Hopping Stread Spectrum Power Line Carrier Communication, 1 page.

JP62030428, Patent Abstracts of Japan, vol. 11 No. 209 (E–521) Feb. 9, 1987, Kondo Tomio, Current Superposition Type High Frequency Circuit, 1 page.

JP1276933, Patent Abstracts Abstracts of Japan, vol. 14, No. 51 (E–0881) Jan. 30, 1990, Uchida Hiroshi, Transformer Bypass Circuit, 1 page.

J. R. Formby and R. N. Adams, "The Mains Network As A High Frequency Signalling Medium," The Electricity Council, Great Britain, Jan. 1970.

J. M. Barstow, "A Carrier Telephone System for Rural Service," AIEE Transactions, vol. 66, 1947, New York, NY, pp. 501–507.

I. C. Vercellotti & I. A. White, "Distribution Power Line Communications for Remote Meter Reading and Selective Load Control," Proceedings of the American Power Conference 1974, vol. 36, pp. 1114–1119.

B. Ron Russell, editor, "Communication Alternatives for Distribution Metering and Load Management," Record of Panel Presentations, 1979 Summer Power Meetings, IEEE Transactions on Power Apparatus and Systems, vol. PAS–99, No. 4, Jul./Aug. 1980, IEEE, New York, NY, pp. 1448–1455.

Glen Lokken et al., "The Proposed Wisconsin Electric Power Company Load Management System," 1976 Nat. Telecomm. Conf., Dallas, Texas, Nov. 1976, IEEE, New York, NY, pp. 2.2–1 to 2.2–3.

J. H. Bull et al., "A Survey of Mains Signalling Within the UK," ERA Report No. 86–0038, ERA Technology Limited, Surrey, England, Apr. 1986, pp. 1–52, AA.2–AA.5, FIGS. 1–33, Table I.

British Standards, "Signalling on low–voltage electrical installations in the frequency range 3KHz to 148.5KHz," BS EN 50065–1, 1992 (2 pages); Electromagnetic compatibility—Generic emission standard, BS EN 50081–1 (2 pages); "Telecontrol equipment and systems," BX 7407 (870–1–1) (1 page).

Draft standard, "Signalling on Low–Voltage Electrical Installations in the Frequency Band 3kKz to 148.5 kHz, Part 4: Filters at the interface of the indoor and outdoor electricity network," EN 50 065–4 Apr. 1992 (11 pages).

Draft standard, Signalling on Low–Voltage Electrical Installations in the Frequency Bank 3kKz to 148.5 kHz, Part 7: Equipment Impedance, EN 50 065–7 Apr. 1992 (3 pages).

"Coaxial Feeder Cables," Engineering Notes, Publication Ref. No. TSP507/1, Pye Telecommunications Limited, Cambridge, England, Jun. 1975, pp. 1–13.

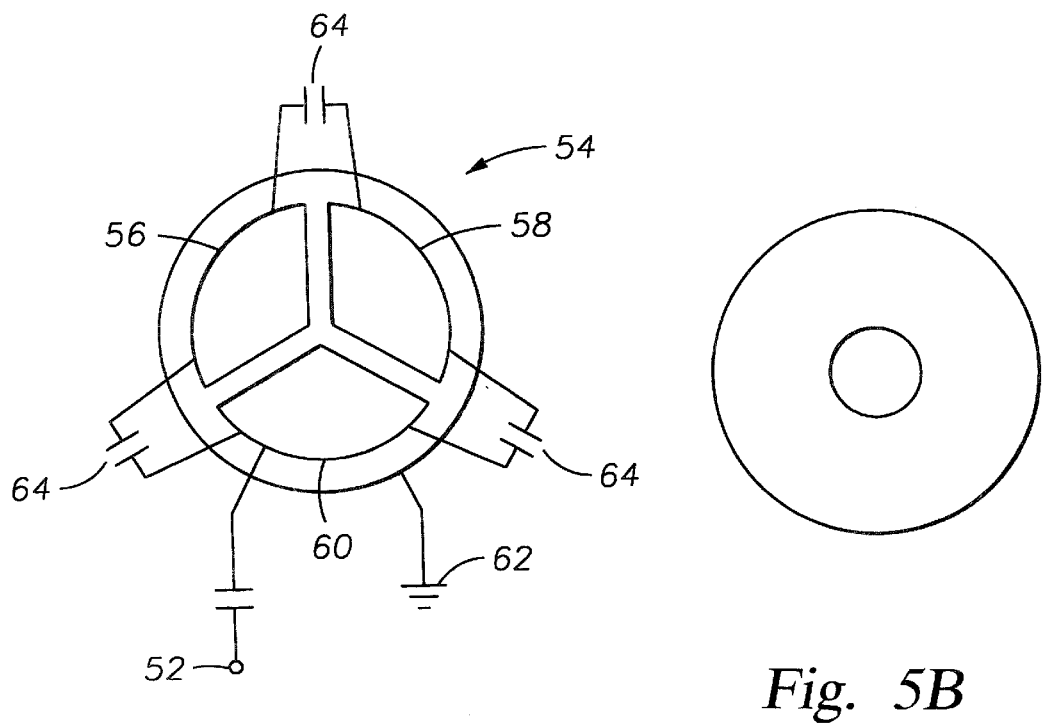
Fig. 5A
Fig. 5B
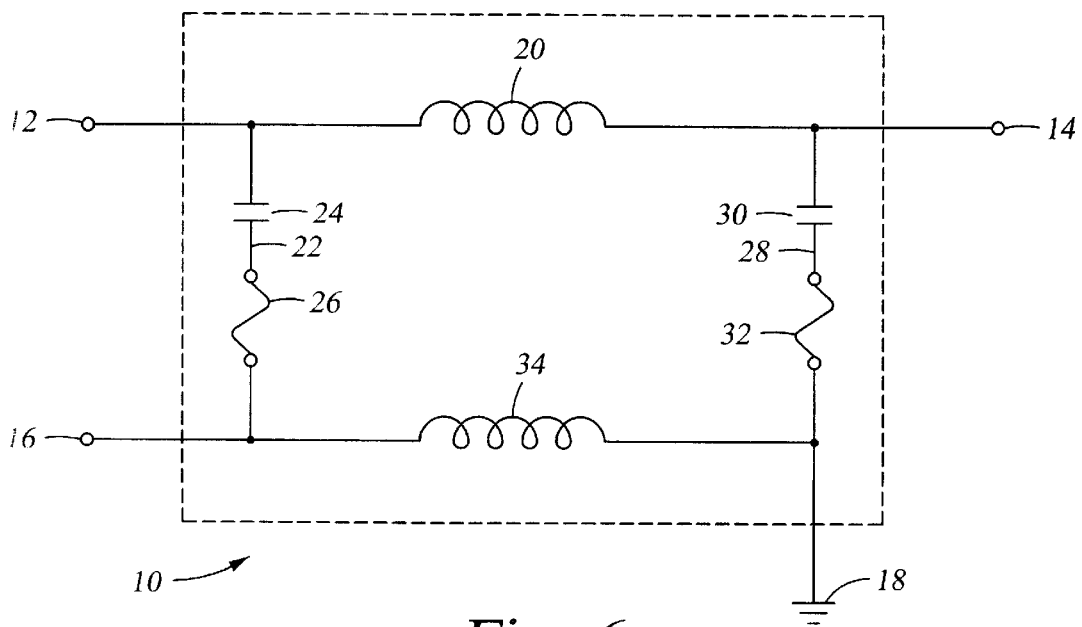
Fig. 6

HYBRID ELECTRICITY AND TELECOMMUNICATIONS DISTRIBUTION NETWORK

RELATED APPLICATIONS

This application is a continuation-in-part of U.S. Ser. No. 08/347,427 filed Nov. 29, 1994 now U.S. Pat. No. 5,684,450 by Paul A. Brown. U.S. Ser. No. 08/347,427 is the U.S. national phase of International Application No. PCT/GB93/02163 filed Oct. 20, 1993, published Apr. 28, 1994 as WO 94/09572 under the title "Transmission Network and Filter Therefor," and claiming priority of GB 9222205.8 filed Oct. 22, 1992.

This application includes subject matter related to U.S. Ser. No. 08/727,530 by Paul A. Brown, which is the U.S. national phase of International Application No. PCT/GB95/00894 as filed on Apr. 20, 1995, published Nov. 2, 1995 as WO 95/29536 under the title "Powerline Communications Network Employing TDMA, FDMA and/or CDMA," and claiming priority of GB 9407934.0 filed Apr. 20, 1994.

BACKGROUND OF THE INVENTION

This invention relates to a method of signal injection, transmission, interconnection (termination), and detection, and to a power transmission network, ie. a mains electricity distribution and/or transmission network, and a filter therefor. In particular it relates to the use of mains electricity networks and/or lines for telecommunications transmission (e.g. voice, data, image and/or video).

In the UK, it is conventional to describe a power network for 33 kV and above as a "transmission network", and one for less than 33 kV as a "distribution network". In this specification the term "electricity distribution and/or power transmission network" is normally used, but general references to power networks and to transmission of signals are to be construed as applying to all such networks.

Traditionally telecommunications signals have been transmitted on independent networks e.g. telephone lines. More recently, in order to simplify and increase efficiency of telecommunications services to domestic or industrial premises, there have been investigations into using existing electricity transmission and distribution networks to carry telecommunications services.

A transmission network and a filter therefor is described in the applicant's co-pending International Patent Application, PCT/GB93/02163. This describes the use of telecommunications signals having a carrier frequency greater than around 1 MHz on a power transmission network. The teaching and disclosure of that patent application should be referred to in relation to the present invention, and is incorporated herein by reference.

At such carrier frequencies, it has been found that the cables of a power transmission and/or distribution network exhibit pseudo-coaxial characteristics and therefore attenuation of a signal transmitted along the cables is reduced. In this way, both speech and data signals can be transmitted at carrier frequencies of greater than approximately 1 MHz, allowing for a larger available spectrum and greater transmission capacity.

However, it has been found that the attenuation effects still limit the distance over which signals of a given carrier frequency and bandwidth can effectively be transmitted. On, for example, a 415 volt network the carrier frequency may preferably be between 1–10 MHZ, and on, e.g., an 11 kV network maybe between e.g. 1–20 MHZ or possibly 5–60 MHZ. Signals of this frequency can be transmitted over large distances (using repeater stations if necessary) and therefore a network used in this way is suitable for general telecommunications and telephony signals.

However broadband telecommunications signals, such as television communications, generally require a higher carrier frequency (or frequencies) and bandwidth. As indicated above, such signals are therefore usually transmitted on an independent broadband telecommunications network e.g. co-axial cable, optical fibre etc.

A carrier frequency of up to hundreds of MHZ may be used on a network as described in PCT/GB93/02163, although the distance over which a signal with a particularly high carrier frequency may be transmitted is limited by the dynamic range sensitivities and power levels deployed on the network—possibly to around 7–40 metres on a typical UK network.

SUMMARY OF THE INVENTION

The present invention aims to provide a transmission network which alleviates some or all of the above problems.

Accordingly, in a first aspect, the present invention provides a network linking a plurality of premises comprising a section of broadband telecommunications network and a plurality of electrical power cables each connected to a respective one of the premises for supplying mains electrical power thereto, each of said power cables also being connected to the section of broadband telecommunications network so that telecommunications signals are transmissible between the section of broadband telecommunications network and each of said power cables, wherein a telecommunications signal is transmissible to and/or from said plurality of premises by being transmitted along the section of broadband telecommunications network and also along the respective power cable of each of said premises.

In this way, the independent (preferably external) telecommunications network can be used to propagate the telecommunications signal over a long distance, with the (preferably external) power transmission/distribution network being used to propagate the telecommunications signal from the telecommunications network into e.g. the premises of a user and vice versa i.e. the communications may be bi-directional.

By "external", it is meant that the signal transmission network i.e. power network and/or telecommunications network is external to any building or premises such as an office or house. Inside such buildings, transmission distances are typically short and therefore attenuation losses relatively unimportant.

The broadband telecommunications network may be a standard broadband distribution network e.g. a coaxial, twisted pair or fibre cable. Such telecommunications networks are currently available in most major countries. However, typically, the greatest cost and inconvenience associated with such telecommunications networks is not the initial installation of the main network but the connection of the main network to the premises of users. The present invention allows the existing power distribution networks (which commonly feed into most suitable premises) to be used to connect the existing telecommunications network to the desired premises. Thus the additional cost and inconvenience of installing further standard telecommunications network is avoided.

Typically, the distance between the existing telecommunications network infrastructure and the premises to which it is desired to be connected is short. Therefore broadband telecommunications signals may be transmitted over the power transmission/distribution network without attenuation losses having any significant effect.

Preferably, the present invention further includes satellite receiving means for receiving telecommunications signals from a satellite transmitter, wherein a telecommunications signal is transmissible from said satellite transmitter to said plurality of premises via said satellite receiving means, said section of broadband telecommunications network and said power cables. Alternatively or additionally, the satellite receiving means may be replaced or supplemented by other telecommunications signal receiving means, such as a TV aerial, telephone connection, data connection, etc.

Preferably, the network includes a plurality of interface units, each of said interface units connecting one of said power cables to said section of broadband telecommunications network, each of said interface units including high pass filter means for allowing high frequency telecommunications signals to pass between said section of broadband telecommunications network and said power cable, and for preventing low frequency mains electrical power signals from passing therebetween.

In a further aspect, the present invention provides a method of transmitting a telecommunications signal between a pair of buildings, including the steps of transmitting the signal from a first building along an external power cable for supplying mains power to the first building, followed by transmitting the signal along a section of broadband telecommunications network, followed by transmitting the signal along a second external power cable for supplying mains electrical power to the second building.

Preferably the telecommunications signal has a carrier frequency greater than approximately 1 MHz. The carrier frequency may in fact be less than 1 MHz ie. 800 kHz or even as low as 600 kHz, but as it is reduced so is the bandwidth. The term "carrier frequency" refers to the unmodulated frequency or frequencies of the carrier signal (s), and not to the frequency of the telecommunications signal or signals once modulated.

A plurality of telecommunications signals may be provided, each having different carrier frequencies.

The power network may include one or more phases, and may be a polyphase network including e.g. any one or more of 2, 3, 4, 6, 7 etc phases. Different sections of the network may include different numbers of phases.

Preferably the power network is a single phase network e.g. consisting of one or more single phase cable(s) connecting one or more customers building(s) or premises to a main polyphase (e.g. 3 phase) portion of the electricity distribution network.

The broadband telecommunications signals are taken e.g. via a tap, from the main broadband distribution network (e.g. coaxial or fibre cable) via a suitable interface unit and fed into the customer's single phase cable via a suitable conditioning unit. The signal may be amplified if necessary.

Preferably the power network is unbalanced i.e. provides unbalanced transmission characteristics. The cable(s) of the power network may be screened or clad e.g. with a suitable metal material, which enables the cable to behave as a pseudo-coaxial element to provide an unbalanced transmission network at the transmission frequency of the present invention.

Preferably the power network is a major (e.g. overground and/or underground) power network including e.g. any or all of 132 kV, 33 kV, 11 kV, 415 v and 240 v sections. The voice and data signals may be transmitted over any or all of the sections of the power network by suitable detection, amplification and/or regeneration and reintroduction as and when necessary.

In a preferred embodiment, full duplex facilities are provided i.e. signals may be transmitted and/or received in all directions simultaneously.

A network according to the present invention may be used for many speech and/or data transmission purposes, such as remote reading of electricity meters, remote banking and shopping, energy management systems, telephony (voice), switched telephony, security systems and/or interactive data services, multimedia services and television.

The present invention also provides a communications apparatus (known hereinafter as a "network conditioning unit") for use with a network according to the above aspects of the present invention. The network conditioning unit includes a low pass filter portion or portions for filtering out the low frequency high amplitude mains power signal i.e. separating it from the telecommunications signal(s) and allowing it to pass through the conditioning unit. The unit also includes a high pass coupling element for input and removal of telecommunications signals from the network and, preferably, a terminating element of similar impedance to the characteristic impedance of the network at that point.

The use of such a unit ensures that the high frequency telecommunications signals do not contaminate the internal low voltage wiring present inside a premises, and/or that noise sources from the internal low voltage premises wiring do not contaminate or corrupt the high frequency telecommunications signals being transmitted over the external electricity transmission and/or distribution network.

Preferably, the variable electrical loading effects (i.e. the load impedances) of all items which are coupled onto the network, from time to time and which utilise electrical energy (i.e. the electrical loads) are isolated from the communications signals by the action of low pass filter element(s) of the conditioning unit(s).

Preferably an electrical filter is used at the interface between the external distribution network and the internal network of the premises, e.g. a house, of a user to ensure that the two signals are separated. Such a filter should have minimal effect on the normal domestic electricity supply.

The filter element of the present invention, which aims to reduce telecommunications signals entering the internal network of a users premises, preferably has no more than 1 volt dropped across it whilst supplying a 100 amp load from a 240 v, 50 HZ, single phase source.

Preferably the network conditioning unit provides impedance matching between reception/transmission devices and the power network. Additionally the network conditioning unit may carry full load or fault current at power frequencies whilst still carrying the voice and data signals.

In a further aspect, the present invention provides a method of signal transmission using a network as described herein.

Where signals are being transmitted along a polyphase (e.g. three phase) electricity power cable, the signal propagation may be between any or all of the phases and ground. In a preferred embodiment the signal is injected between only one of the phases and ground, which also provides unbalanced transmission characteristics and the cable behaves as a pseudo coaxial transmission line.

Where signals are being transmitted along a single phase electricity distribution service cable a pseudo-coaxial effect may also be obtained. Single phase cables may typically be either concentric or split-concentric. In the case of a split-concentric cable, means (such as a capacitive coupling between the parts of the split-concentric sheath) may be provided so that at the desired frequency the cable behaves as a standard concentric cable. Thus a pseudo-coaxial effect is achievable and the cable provides an unbalanced transmission characteristic.

A wide range of different transmission techniques are available for use with electricity power line communication each using various modulation methods including amplitude, frequency, phase; single, double and vestigal sideband, pulse position, width and amplitude; frequency shift keying (FSK), Gaussian filtered FSK (GFSK), Gaussian minimum shift keying (GMSK), Quaternary phase shift keying (QPSK), Orthogonal quaternary phase shift keying (OQPSK), Quadrature amplitude modulation (QAM), Pi/4 QPSK etc, together with various multiplexing, duplexing and multiple access techniques including frequency (FDM) (FDD), time (TDM) (TDD), code division (CDM) (CDMA) etc. It has been determined that the spread spectrum method offers inherent security and good interference rejection characteristics. These properties are achieved using a large bandwidth and hence requires the design of a specific filter.

A large number of standard cordless telephone communication techniques may be suitable for effecting signal transmission over a conditioned network. Suitable standards may be CT0, CT1 and CT2, AMPS, DECT (Digital European Cordless Telephone Standard), IS-54, IS-95, GSM, Q-CDMA, R-CDMA, UD-PCS, PHS, PACS, TACS, ENTACS, NMT450, NMT500, C-450, RTMS, Radicom 2000, NTJ, JTACS & NTACS, DCS 1800 etc.

The network conditioning unit preferably includes a low pass filter comprising a main inductor arranged between a mains electricity input and a mains electricity output and connected at each end thereof to a signal input/output line which is arranged in parallel to the mains electricity input and mains electricity output, the two connections including a first capacitor and a second capacitor each of a predetermined capacitance depending upon the portion of the frequency spectrum which is to be utilised for communications purposes.

In this arrangement the main inductor is operative to prevent communications signals from the signal input/output line from entering the domestic/industrial premises. This inductor is therefore preferably of a high inductance such as 10 $\mu$H to 200 $\mu$H for frequencies of 1 MHz and above.

The first capacitor which connects the mains electricity input and the signal input/output line acts as a coupling capacitor to allow communication signals through from the signal input/output line. whilst attenuating all low frequency components at or about the main electricity supply frequency (ie., 50/60 Hz).

The second capacitor arranged between the mains electricity output and the signal input/output line provides a further attenuation of communication signals and is connected via the signal input/output line to ground.

In the event of failure of either the first or second capacitor each such capacitor is preferably provided with a respective fuse arranged between the first or second capacitor and the signal's input/output line. Furthermore an additional safety precaution can be incorporated by provision of a second inductor arranged between the connections between the signal input/output line and the first and second capacitors. This inductor has no effect on communication frequency signals but will provide a path to ground if the first capacitor develops a fault thereby allowing the first fuse to blow without allowing the power frequency signal onto the signal input/output line.

The inductance of the main inductor depends upon the material of which it is made and the cross-section of the wire wound around the core. The 10 $\mu$H inductance previously specified is preferably a minimum and with use of better core material a higher inductance, for example of the order of 200 $\mu$H, can be obtained. Alternatively, a number of inductors connected in series could be used.

The coupling capacitor has a capacitance preferably in the range 0.01 to 0.50 $\mu$F and the second capacitor linking the mains electricity output with the signal input/output line and ground has a capacitance preferably in the range of 0.001 to 0.50 $\mu$F.

The second inductor arranged on the signal input/output line preferably has a minimum inductance of approximately 250 $\mu$H. This inductor therefore has no effect on communication frequency signals on the signal input/output line. The conductor used to construct the 250 $\mu$H inductor should be of sufficient cross-sectioned area to take fault current should the decoupling capacitor fail to short circuit condition.

Preferably, any spurious self resonance in the inductive or capacitive elements are avoided. As the lower cut off frequency of the conditioning unit is increased the minimum values of inductance and capacitance may be proportionally reduced.

In a preferred embodiment the filter is assembled in a screened box so as to provide a good earth and prevent radiation of the communication signals.

In a further aspect, the present invention provides a signal transmission network including at least one telecommunications network portion and at least one power transmission and/or distribution network portion.

In a further aspect, the present invention provides an power transmission and/or distribution network including input means for the input of a telecommunications signal onto the power transmission network, (e.g. an electricity transmission and/or distribution network) from a telecommunications network, and output means for removal of a similar telecommunications signal from the power network.

In a further aspect, the present invention provides an electricity distribution and/or power transmission network having a number of phases, said number being chosen from the list 1,2,4,5,6,7,8,9, . . . n (where n is an integer greater than 9), but preferably having 1 or 2 phases, and including input means for the input of a telecommunications signal having a carrier frequency greater than approximately 1 MHz onto at least one of the phase conductors of the network and output means for removing said telecommunications signal from at least one other phase conductor of the network.

In a further aspect, the present invention provides an unbalanced electricity distribution and/or power transmission network at least a part of which comprises a clad cable, the network including input means for the input onto the network of a telecommunications signal having a carrier frequency greater than approximately 1 MHz and output means for removing said telecommunications signal from the network, said signal being transmissible along said part of the network having clad cable.

In a further aspect, the present invention provides a trunk and branch multipoint electricity distribution and/or power transmission network including input means for the input onto the network of a telecommunications signal having a carrier frequency greater than approximately 1 MHz and output means for removing said telecommunications signal from the network.

In a further aspect the present invention provides an electricity distribution and/or power transmission network at least part of which is external to a building, the network including input means for the input onto the network of a telecommunications signal having a carrier frequency greater than approximately 1 MHz and output means for removing said telecommunications signal from the network, said signal being transmissible along said external part of the network.

In a further aspect, the present invention provides a method of signal transmission including input of a telecommunications signal having a carrier frequency of greater than approximately 1 MHz onto at least one phase conductor of an electricity power distribution and/or transmission network, and subsequent reception of the signal from at least one other phase conductor of the network, said network having a number of phases, said number being chosen from the list 1,2,4,5,6,7,8,9, . . . n (where n is an integer greater than 9), but preferably having 1 or 2 phases.

Any or all of the above aspects may include features described elsewhere in this specification.

BRIEF DESCRIPTION OF THE DRAWINGS

Embodiments of the present invention will now be described with reference to the accompanying drawings in which:

FIG. 5A is a cross section through a typical three phase cable;

FIG. 5B is a section through a typical coaxial cable;

FIG. 6 is a preferred embodiment of a network conditioning unit used in the present invention;

DETAILED DESCRIPTION OF THE PREFERRED EMBODIMENTS

Figure 1:
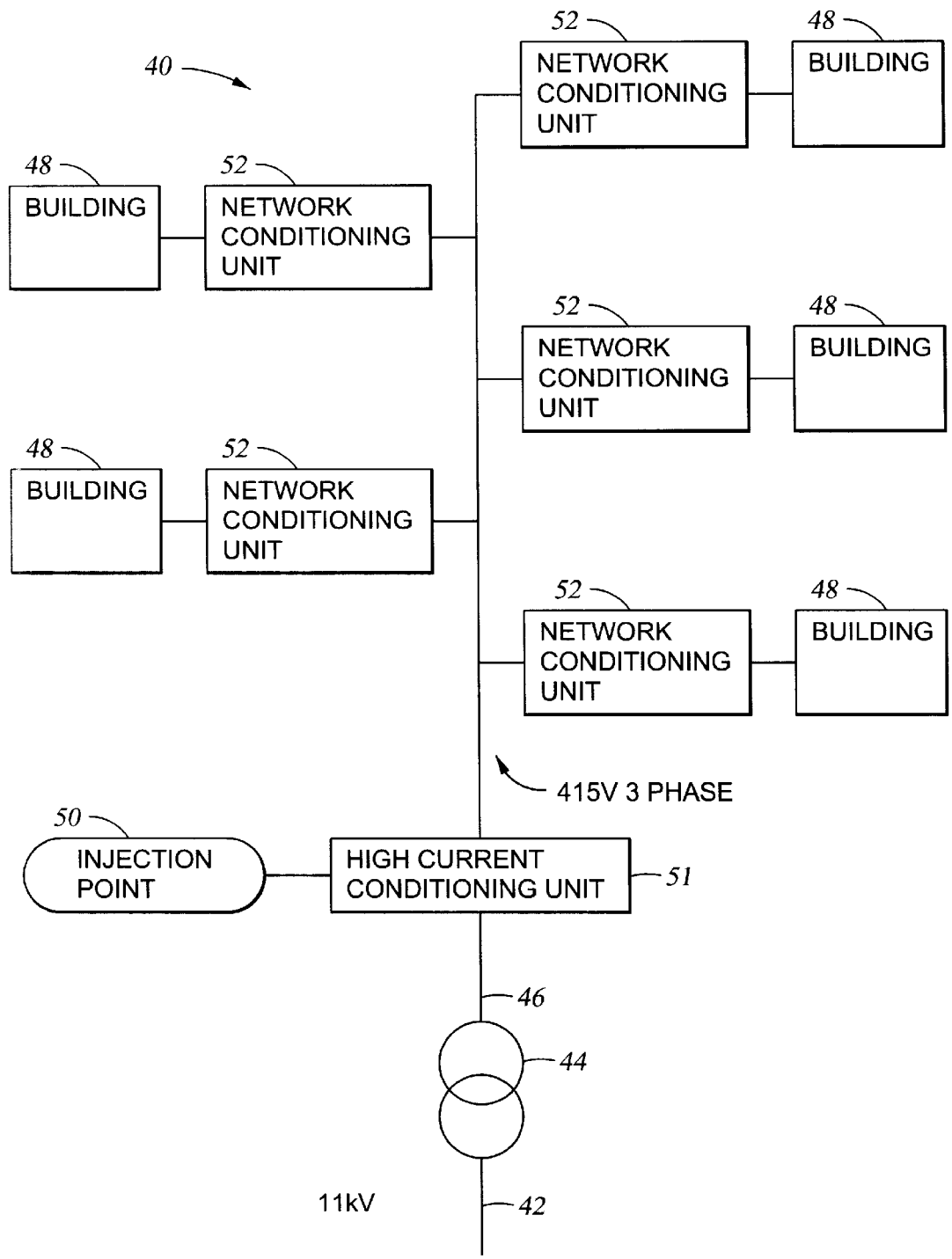
FIG. 1 is a schematic diagram of a part of a network according to aspects of the present invention.

FIG. 1 shows generally a network 40. Mains electricity enters the network from an 11 kV transmission line 42, via a transformer 44 and onto a 415 v three phase network 46. The 415 v three phase network is supplied to a number of locations, such as buildings 48. Each of these buildings may receive only a single phase electricity supply or alternatively may receive a three phase power supply.

Voice and data signals may be injected into the network (or alternatively received from the network) to/from a telecommunications network (e.g. co-axial, fibre or twisted pair cable), or a further part of the electricity distribution/transmission network, at an injection point 50, to be transmitted and/or received by users in the premises 48. These signals may be narrow bandwidth e.g. telephony signals, or broadband e.g. television signals, as desired—depending on the attenuation and distance to be travelled along the power distribution network.

Figure 11A:
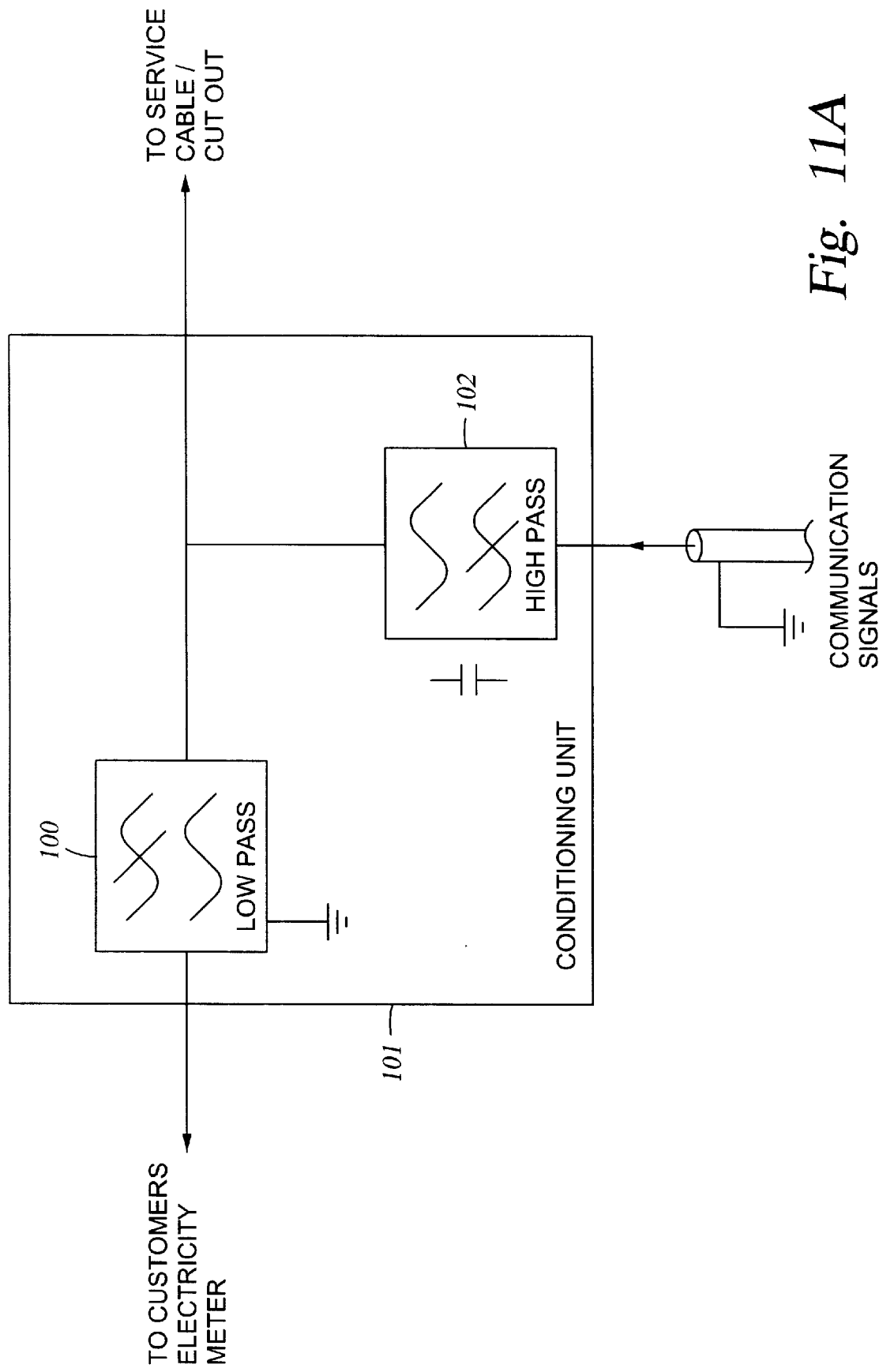
FIGS. 11a and 11b are second and third schematic diagrams of a network conditioning unit as used in the present invention.

In order to separate the voice and data communication signals from the low frequency high amplitude power signal each signal source and/or destination is provided with a network conditioning unit 52—shown in more detail in figure 11a. This network conditioning unit includes a low pass filter for separating out the two signals.

Figure 11B:
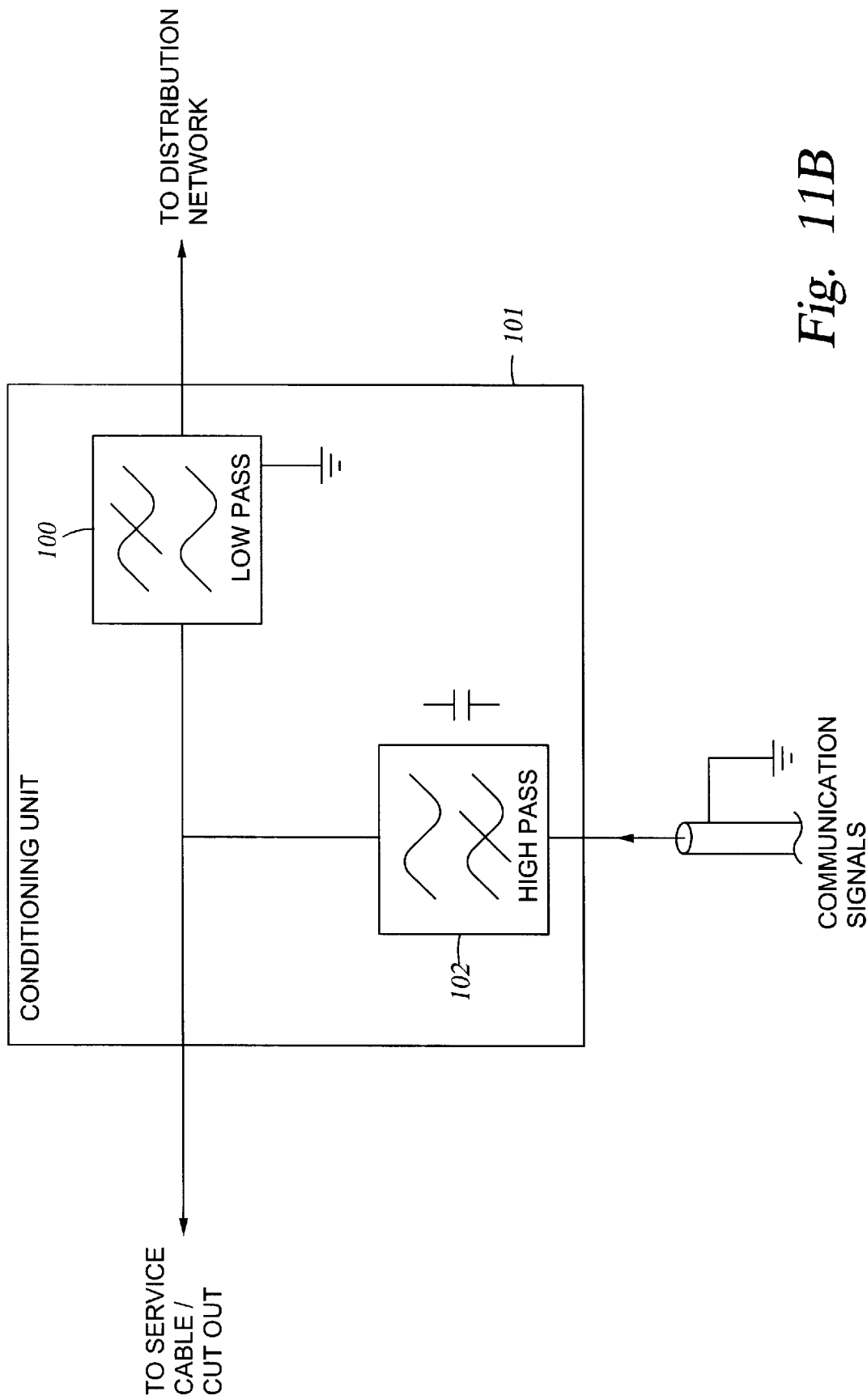

A further (high current) conditioning unit 51—shown also in FIG. 11b—may be fitted between the electricity and distribution transformer 44 and the injection point 50 in order to further remove transformer noise from the condition network 40. The unit 51 is fitted with a high current inductor.

Figure 13:
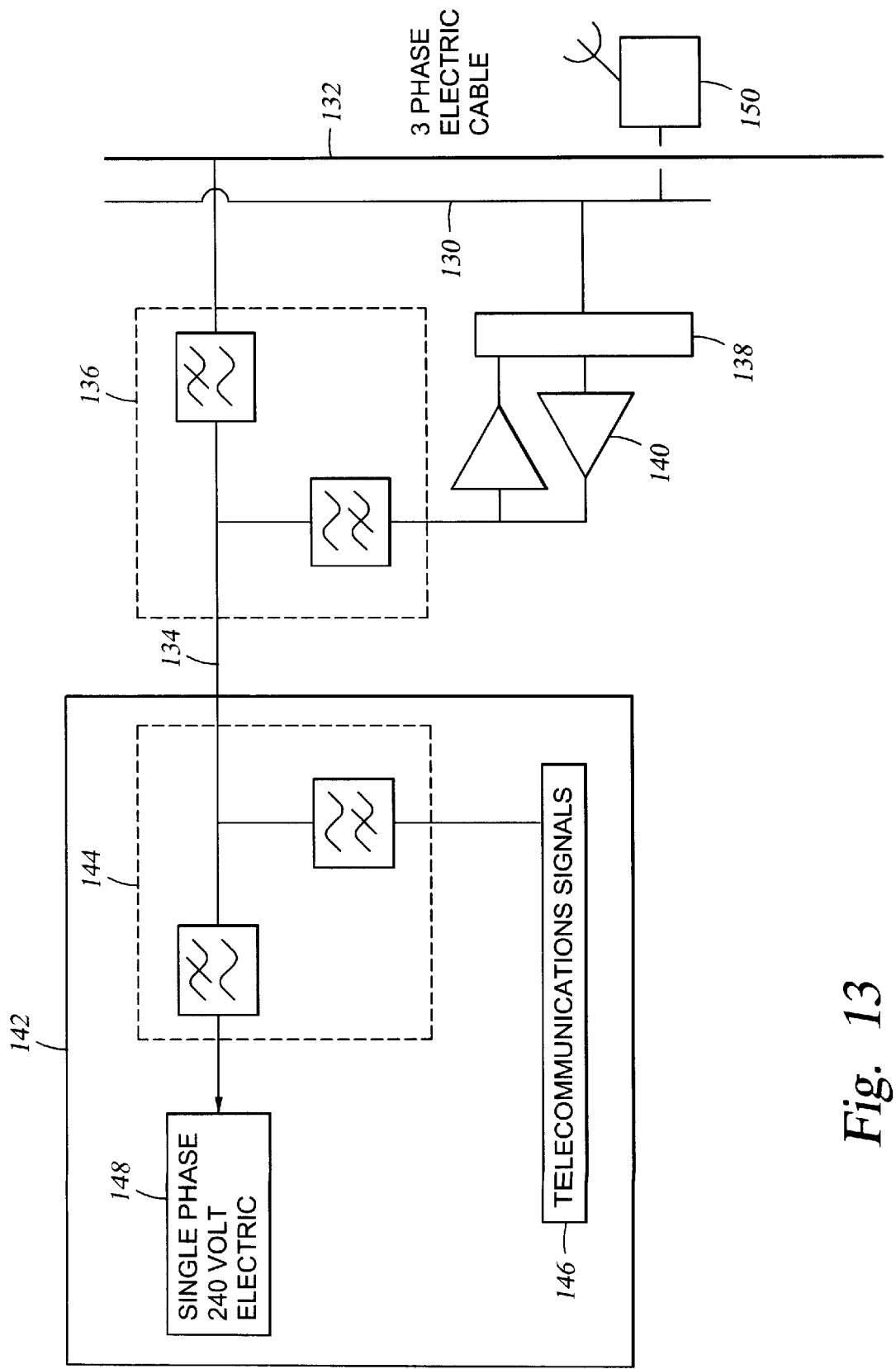
FIG. 13 shows a hybrid network according to an aspect of the present invention.

FIG. 13 illustrates a portion of a hybrid signal transmission network according to the present invention. A part of a cable 130 of a broadband telecommunications network (e.g. a coaxial, fibre or twisted pair cable) is illustrated running (for the purposes of this example) parallel to an e.g. 3 phase electricity distribution cable 132. The electricity distribution network 132 may also carry telecommunications signals of suitable carrier frequency and bandwidth, as described elsewhere in this specification and that of PCT/GB93/02163. The telecommunications network 130 carries broadband telecommunications signals e.g. television signals.

The telecommunications signals e.g. television signals, which may be analogue and/or digital format, are input (or removed) from the telecommunications network 130 onto (or from) a portion 134 of the external electricity distribution network 132 via a conditioning unit 136. The conditioning unit 136 allows the telecommunications signals to be input onto (or removed from) the electricity cable 134 without either the telecommunications signals entering the electricity distribution network 132 or the electricity signals entering the telecommunications network 130.

Similarly telecommunications signals may be input onto the telecom network from the portion 134 of the electricity distribution network 132.

If necessary, a coaxial/fibre interface unit 138 and an amplifier (e.g. a broadband amplifier) 140 may be used to interface between the telecommunications network 130 and the conditioning unit 136. The amplifier 140 may be bi-directional (as shown) or uni-directional (in either direction, as required).

Preferably the portion 134 of the external electricity distribution network 132 is a single phase cable. This may be a concentric single phase cable or a split-concentric single phase cable set up to act as a pseudo-concentric cable as described with reference to FIGS. 12A, 12B and 12C. Typically, this single phase cable connects a users premises 142 to the e.g. 3 phase electricity distribution network 132.

Located in or near the user premises 142 may be a second conditioning unit 144 which separates the telecommunications signals 146 from the electricity supply 148. Thus distribution of both electrical energy and broadband telecommunications signals is facilitated without mutual impairment and without the need for a further coaxial/fibre link between the telecommunications network 130 and the user premises 142.

A plurality of such links may be made from the telecommunications network 130 to a corresponding plurality of users premises. Also, the telecommunications network 130 may be connected directly to the broadband telecommunications signal(s) transmitter, or alternatively may be connected via a radio or satellite link 150.

The conditioning unit(s) 136 may be sited e.g. at street level, such as in a curb-side pillar or vault and adjacent to the electricity service position within the customers premises. The conditioning unit(s) 142 may be sited, for example, near the customers premises or within the customers premises such as inside a HRC cut-out unit and/or the electricity meter.

Figure 2:
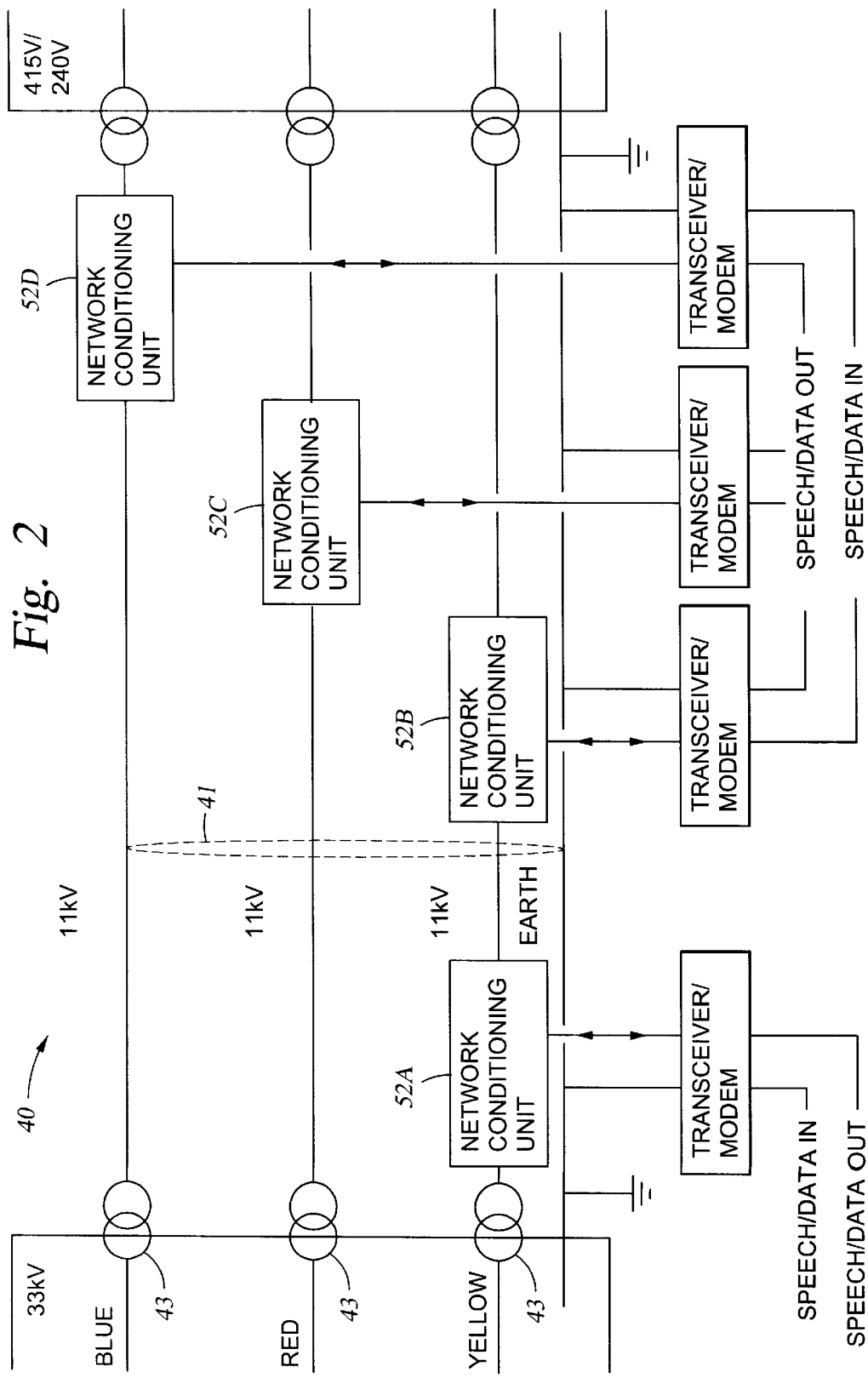
FIG. 2 is a schematic diagram of a first transmission system for a network shown in FIG. 1.

FIG. 2 shows a portion of a three phase network 40 into which and from which data signals may be transmitted and received using the network conditioning units 52. The cable of the network is clad i.e. is surrounded by a sheath 41 e.g. along all or substantially all of its length. As an example, data signals could be transmitted onto the yellow phase of the network by network conditioning unit 52A i.e., the signal is applied between the yellow phase and earth as shown. The transmitted data may then be received by any or all of conditioning units 52B, 52C and 52D which are connected to the yellow, red and blue phases respectively. In other words transmitted data may be picked up on any phase of the cable, including the phases onto which the signals were not injected by the transmitting unit. This is due to the mutual capacitance between the phase conductors producing an effectively pseudo-coaxial nature of the three phase cable. As can be seen, data can be transmitted and received by each unit.

Each phase of the network 40 is shown to include a transformer 43. Typically this is effected by a single three phase transformer for all three phases, and not by three separate single phase transformers—although the latter may be possible.

Figure 3:
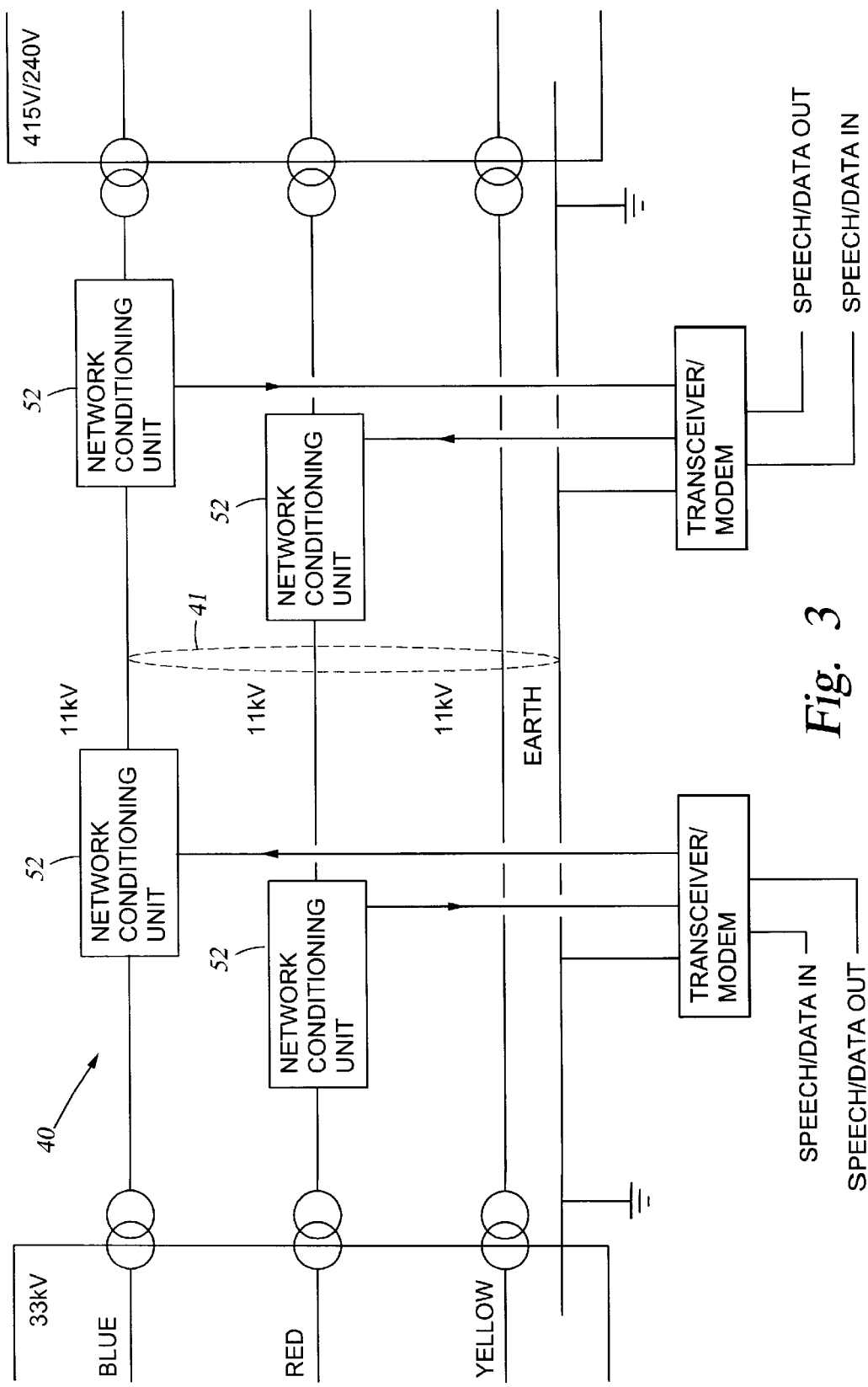
FIG. 3 is a schematic diagram of a second transmission system for a network shown in FIG. 1.

FIG. 3 shows a portion of a three phase power network 40 into which and from which data signals may be transmitted and received using four network conditioning units 52. As shown, the data signals are transmitted across two phases of the three phase network—in this case the red and blue phases.

If one or more phases are not in use (e.g. the yellow phase in FIG. 3), the non-used phase(s) may be terminated to provide an appropriate impedance. This may be done using an "L" circuit i.e. a series inductor with a shunter capacitor on the transformer side. This provides an optimum impedance and ensures that an RF signal which is coupled between e.g. the red and yellow phases, is not shunted down by a low impedance transformer connection. This is particularly useful if there is insufficient inductive reactance at e.g. the yellow phase transformer connection point.

Figure 4:
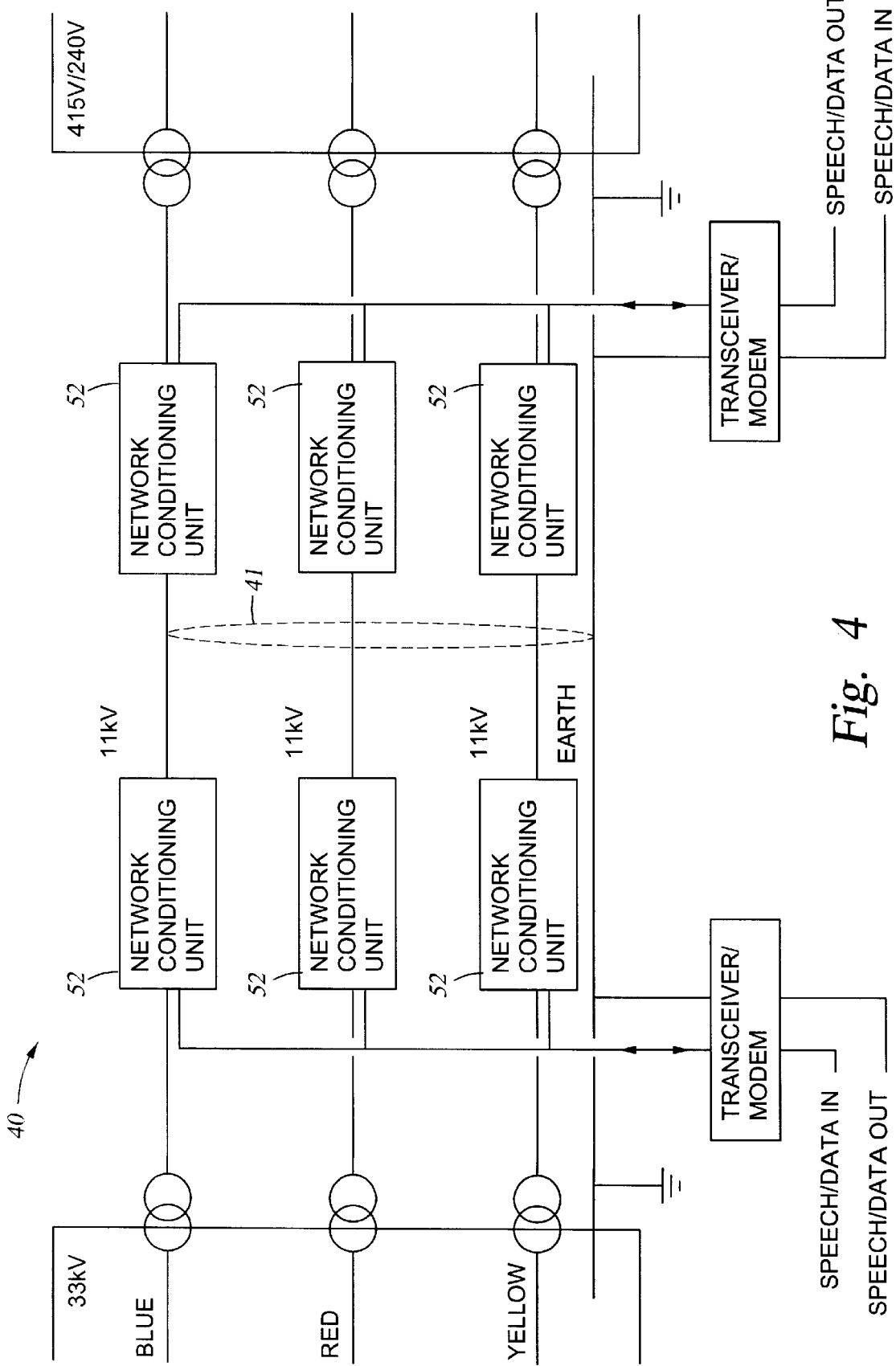
FIG. 4 is a schematic diagram of a third transmission system for a network shown in FIG. 1.

In FIG. 4 an alternative transmission system to FIG. 2 is shown, in which the data signals are transmitted across all three phases, i.e. blue, red and yellow, of the three phase network 40.

FIG. 5A shows a simplified cross section of a three phase power cable 54, including red phase 56, yellow phase 58, and blue phase 60. Data signals are transmitted between blue phase 60 and earth 62, and are injected into the network via network conditioning unit 52. At high frequencies, the mutual capacitance between the phases effectively produces a short circuit. Therefore, such a transmission system gives a pseudo-coaxial characteristic, roughly equivalent to the coaxial cable shown in FIG. 5B. The mutual capacitance between any two of the phases in the three phase cable is shown schematically as 64 in FIG. 5A—similar mutual capacitance exists between other parts of phases.

The basic elements of a network conditioning unit 101 according to one aspect of the present invention are illustrated in FIGS. 11a and 11b. FIGS. 11a and 11b show conditioning units as designated 52 and 51 in FIG. 1 respectively. The conditioning unit can be considered to be equivalent to a low pass filter 100 and a coupling capacitor element 102 (which can be considered to be a high pass filer element).

The low pass filter element 100 allows mains power to be supplied from the distribution network to a consumer whilst preventing high frequency communication signals from entering the consumers premises. A coupling capacitor, or high pass filter element, 102 is provided to couple the high frequency communication signals onto the distribution network whilst preventing the mains power from entering the communications apparatus.

The conditioning unit components may be fitted into e.g. an electricity meter case located in a consumer's premises, or possibly may be set into a compartment at the rear of such a meter. Alternatively the necessary components may be located in e.g. a customer's high rupturing capacity (HRC) fuse or cut-out unit.

Referring to FIG. 6, an embodiment of a conditioning unit (essentially a filter) according to an aspect of the invention is indicated generally by the reference numeral 10 and is connected between a mains electricity input 12 and a mains electricity output 14. A signal input/output line 16 is also connected into the filter. The mains power line is a standard 50 Hz mains electricity power supply providing a domestic electricity power source of 240 v at a maximum current of 100 amps for normal usage.

The filter 10 is assembled into a metal box which prevents radiation of the communication signals to externally located appliances and which provides a connection 18 to earth for the signal input/output line 16. The filter 10 includes a first or main inductor 20 formed of 16 mm$^2$ wire wound on a 10 mm diameter, 200 mm long ferrite rod with 30 turns of wire therearound. This provides an inductance of approximately 50 $\mu$H. This may be a minimum for the signal characteristics utilised. The use of better materials or a plurality of series inductors would increase the inductance of the inductor up to, for example, approximately 200 $\mu$H.

Each end of the main inductor 20 is provided with a connection to the signal input/output line 16. A first connection 22 between the mains electricity input 12 and signal input/output line 16 comprises a first or coupling capacitor 24 having a capacitance of between 0.01 and 0.50 $\mu$F, and preferably around 0.1 $\mu$F. This coupling capacitor 24 is connected to a first fuse 26 which is arranged to blow in the event of failure or a fault developing in capacitor 24.

A second connection 28 includes a second capacitor 30 having a capacitance of between 0.001 and 0.50 $\mu$F, preferably around 0.1 $\mu$F. This capacitor provides further attenuation of the communication signals by shorting to the earth or ground 18. A second fuse 32 is provided to blow if a fault develops in the second capacitor 30 thereby preventing further unit damage.

The signal input/output line 16 is connected to includes a second inductor 34 having an inductance of approximately 250 µH minimum. This inductor is provided as a damage limiter in the event of failure of the coupling capacitor 24. In the event of such failure this inductor provides a path to the ground 18 for the 50 Hz mains electricity power frequency thereby blowing fuse 26. The inductor has no effect on the communication frequency signals present on the signal input/output line 16.

Figure 7:
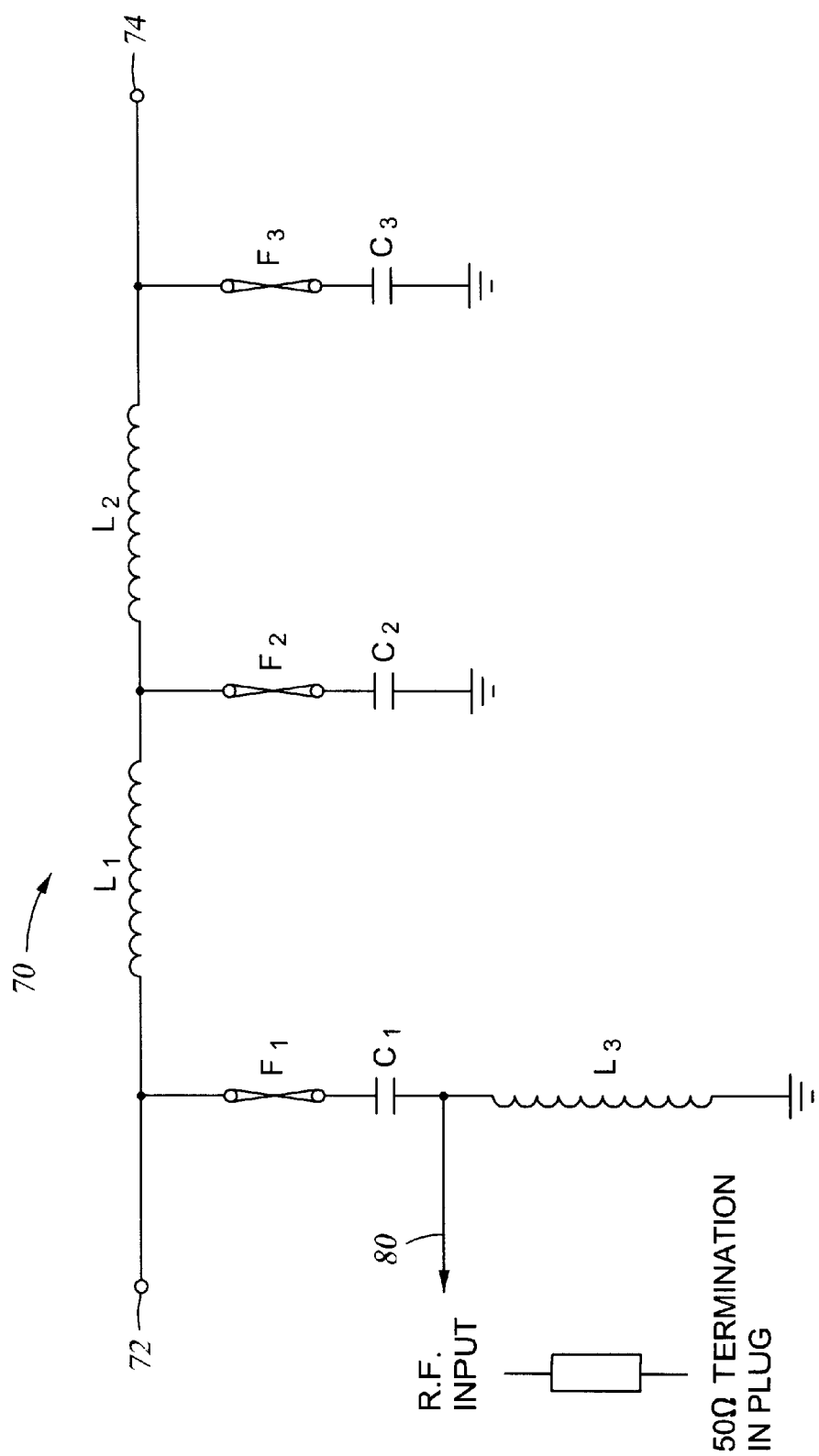
FIG. 7 is a second embodiment of a network conditioning unit used in the present invention.

FIG. 7 shows a second embodiment of a filter according to an aspect of the present invention. The filter 70 includes a pair of inductors L1, L2 arranged in series between a mains electricity input 72 and a mains electricity output 74. A preferred value for L1 and L2 is approximately 16 µH. Connected between the RF input line 80 and the mains input 72 is a first fuse F1 and capacitor C1, and connected between the RF input 80 and ground is a third inductor L3, which acts as an RF choke and has a typical value of 250 µH.

Connected in a similar fashion between the connection point of L1 and L2 and ground is a second fuse F2 and second capacitor C2. Connected between the mains electricity output 74 and ground is a third fuse F3 and third capacitor C3. Typical value for the capacitors is around 0.1 µF and for the fuses approximately 5 amps HRC (high rupturing capacity).

The values given for these components are exemplary only, and different preferred values will be appropriate for other design frequencies.

Figure 8:
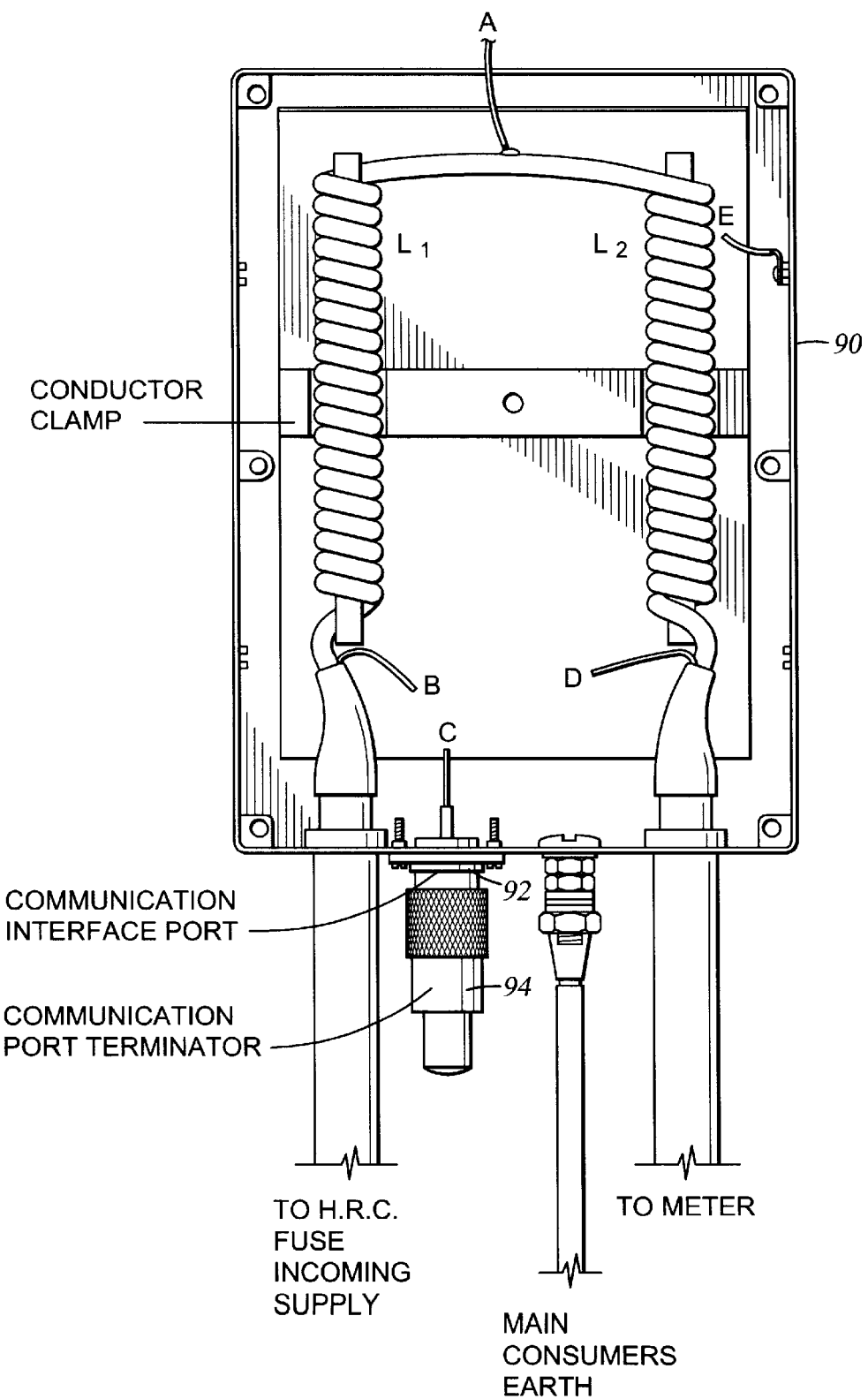
FIG. 8 is a plan view of a network conditioning unit.

Turning to FIG. 8 a typical housing arrangement for a network conditioning unit according to an embodiment of the present invention is shown. The main inductors L1 and L2 are housed within a shielding box 90. Various connections are shown, including a communication interface port 92 to which a user's communication equipment would normally be connected. However, as shown in FIG. 8, this port may be terminated in an impedance matching port terminator 94.

Figure 9:
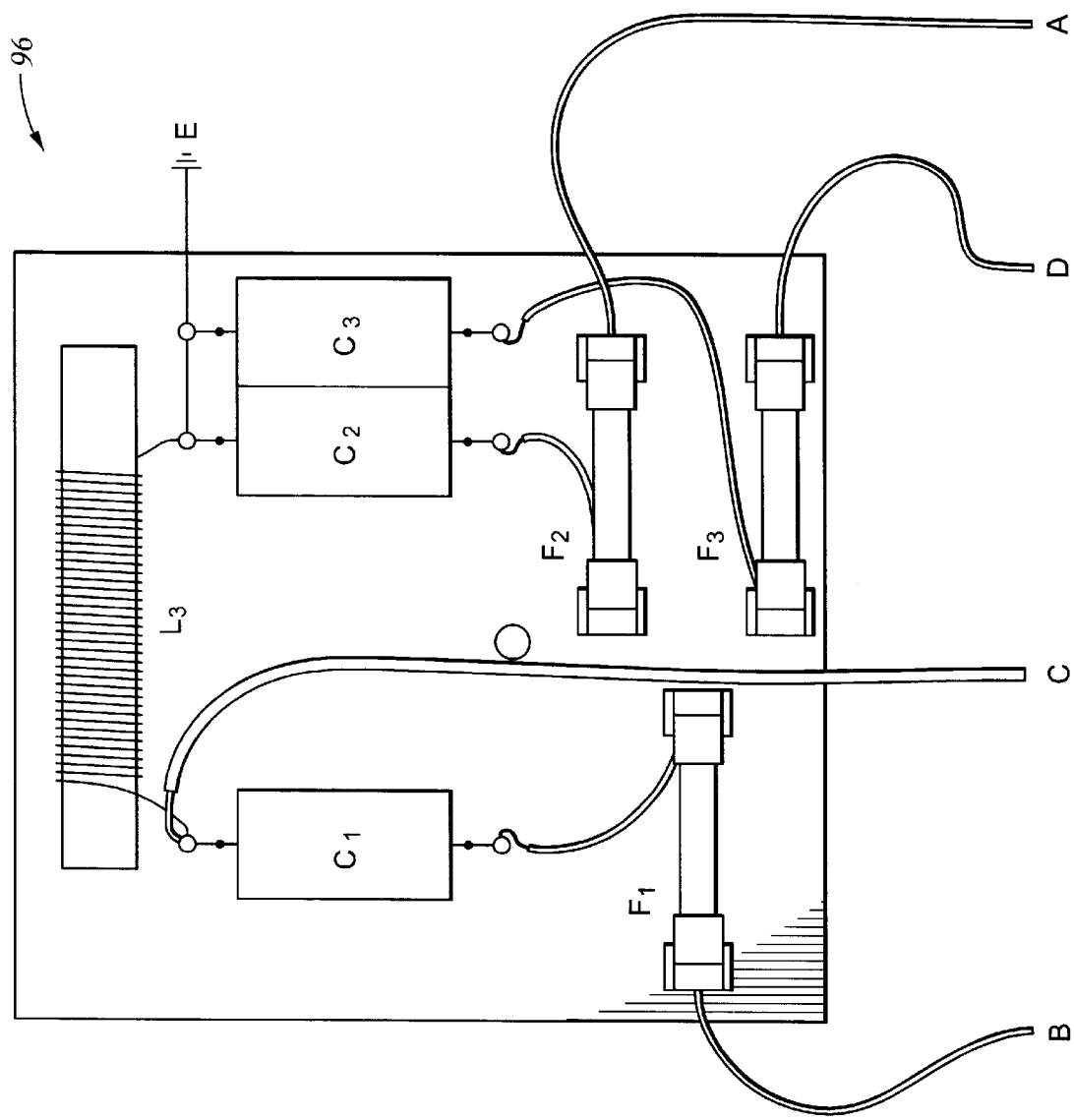
FIG. 9 is a view of a circuit board for the network conditioning unit of FIG. 8.

FIG. 9 shows a circuit board 96 which fits inside the unit 90 of FIG. 8 and houses the rest of the circuitry for the network conditioning unit of FIG. 7. Connections A, B, C, D and E are shown which connect to the appropriate points of the box shown in FIG. 8.

Figure 10:
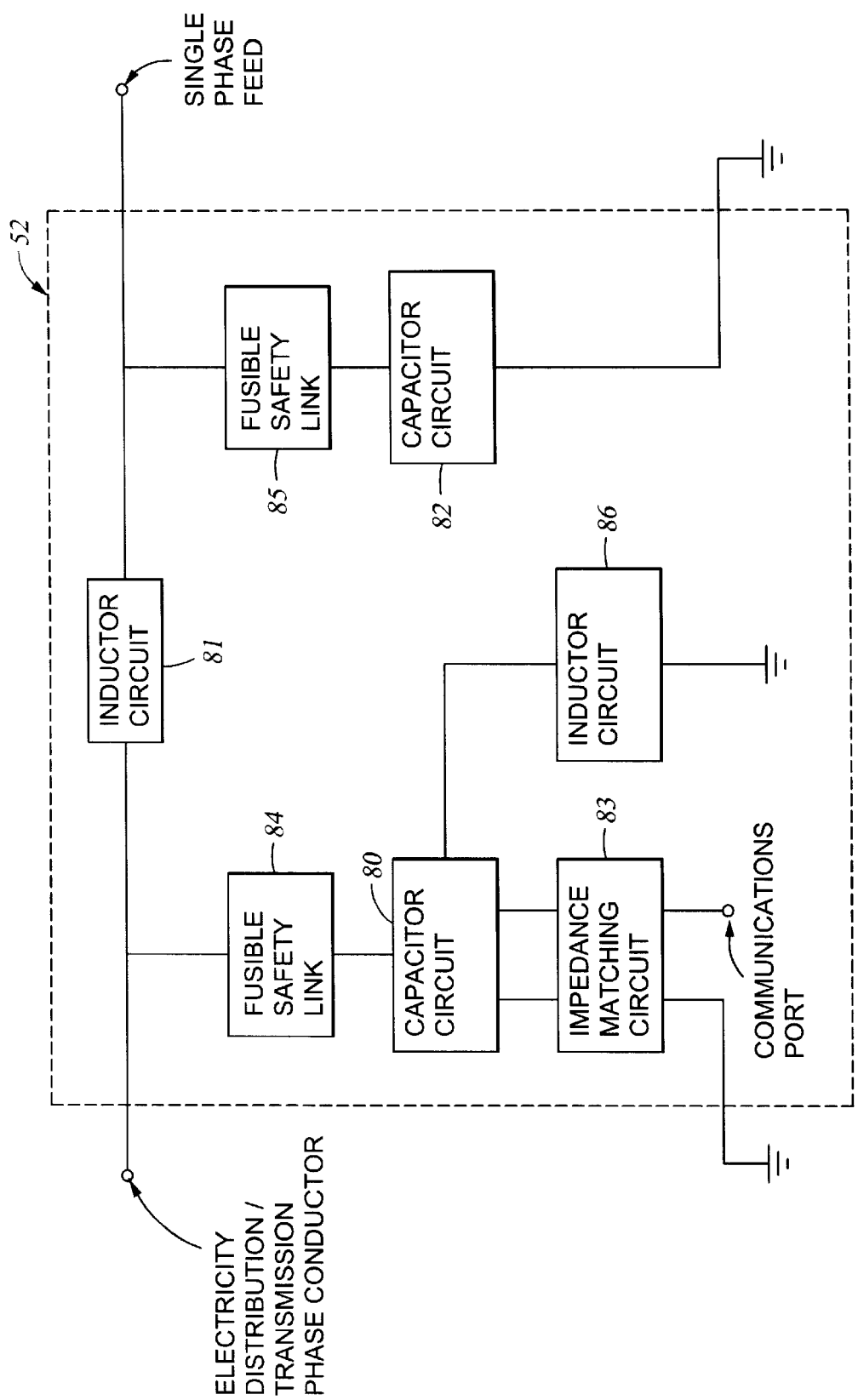
FIG. 10 is a schematic diagram of a network conditioning unit as used in present invention.

FIG. 10 is a schematic representation of a network conditioning unit 52, showing the various building blocks 80–86 of the network conditioning element. To design a suitable network conditioning unit, the circuits represented by blocks 81 and 86 should be high-impedance elements over the required communications frequency spectrum (eg. 1 MHz and above) and low impedance elements at frequency of mains electricity supply (ie. 50/60 HZ) ie. these elements are inductors. Similarly blocks 80 and 82 should be low impedance coupling elements over the required communications frequency spectrum and high impedance isolating elements at the frequency of the mains electricity supply ie. they are capacitors.

HRC (high rupturing capacity) fault current limiting fusible safety links (84 and 85) are provided in series with elements 80 and 82. An additional impedance matching network 83 may be included for connection to a communications port. This element may be external to the network conditioning unit 52.

The optimum values of items 81, 80, 82 and 86 will be dependant upon factors including:

a) The required frequency range over which the network is to be conditioned.

b) The unit length of the network which is to be conditioned.

c) The number and types of loads which may be encountered on the network.

d) The characteristic impedance of the network phase conductors with respect to earth ie. conductor outer electrical sheath.

e) The impedance of the communications interface devices.

The network conditioning unit may be filled with air, inert gas, resin compound or oil depending upon the location and load and/or fault current ratings of the conditioning unit. Also it may be sited indoors, pole mounted, buried underground or inserted in street lamp columns.

Similarly items 81 and 86 may comprise of a number of individual inductors in series, and if no interconnection is required, for example, on a street light, items 84, 80, 83 and 86 may be omitted.

Items 80 and 82 may comprise of a number of capacitors in series and/or parallel configuration depending upon working voltages encountered ie. 240, 415, 11 kV, 33 kV etc. Alternatively, or additionally, items 80 and 82 may comprise of two or more capacitors in parallel in order to overcome, for example, deficiencies in capacitor design when conditioning a network over a relatively wide frequency range, for example 50 MHZ to 500 MHZ.

Furthermore, items 81, 85 and 82 of the network conditioning unit may be cascaded if required. In a typical design, the greater the number of cascaded elements the sharper will be the roll off response of the filter and the greater its attenuation.

Figure 12A:
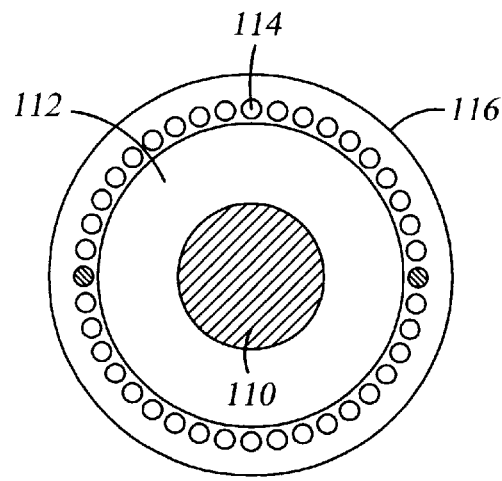
FIGS. 12A, 12B and 12C show sectional views through a concentric, split-concentric and pseudo-concentric cable respectively.
Figure 12B:
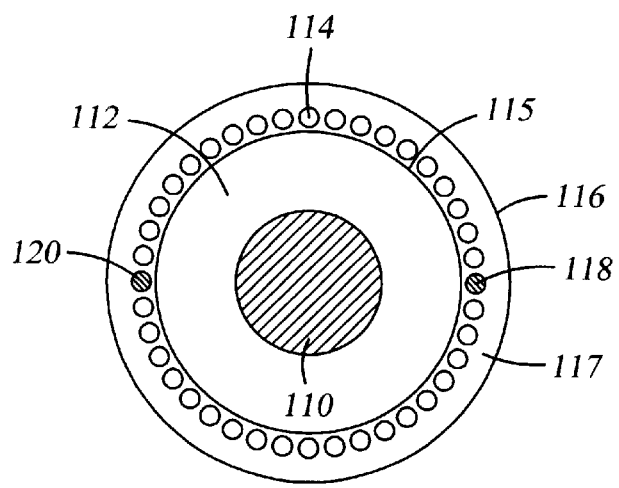
Figure 12C:
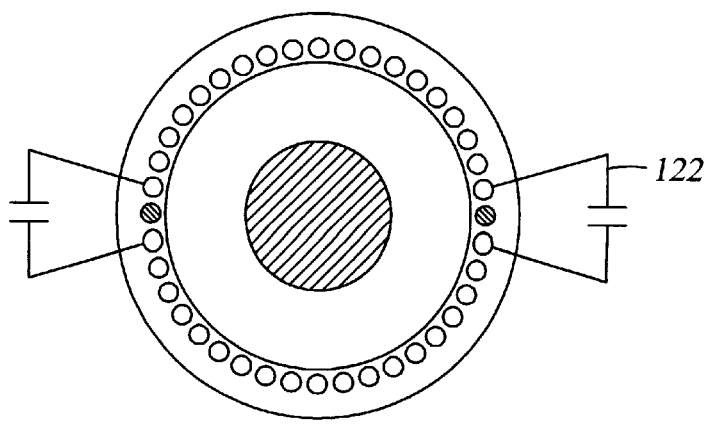

FIGS. 12A, 12B and 12C show sectional views through a single phase concentric, split-concentric and "pseudo"—concentric cables respectively. A typical concentric single phase cable (as illustrated in FIG. 12A) consists of a central metallic conductor core (typically aluminium) 110 surrounded by an insulating layer 112 (typically PVC). Around the insulating layer 112 are laid a plurality of metallic conductors 114 (typically copper) over which lies an insulating and protective sheath 116 (typically PVC). In use the neutral and earth are combined in the outer sheath of metallic conductors 114.

A split-concentric cable (as illustrated in FIG. 12B) is similar to the concentric cable except that the outer layer of metallic conductors 114 is split into two portions—e.g. an upper portion 115 and a lower portion 117. These portions are divided by insulators 118, 120 and in use the neutral and earth are split so that one portion of the outer metallic sheath carries only one of them.

In order to maintain a pseudo-coaxial effect in the split-concentric service cables at the desired transmission frequencies (e.g. above 1 MHz) one or more capacitors 122 may be connected between the upper and lower portions 115, 117 of the outer metallic sheath 114. These capacitor(s) may be fitted e.g. at the termination and/or conditioning points of the cable.

It will be seen from the foregoing that a simple filter is provided which effectively separates signals having a frequency spectrum indicative of radio communication signals from those of standard mains electricity power supply without significant loss of power or quality in either signal. Thus the electricity distribution and/or transmission networks can be used for both the provision of electricity supply and the propagation of broadband telecommunications signals which may be analogue and/or digital in format.

The use of such a filter at each consumer supply point in a low voltage underground electricity distribution network provides a conditioned network suitable for the transmission of high frequency communication signals together with the distribution of 50 Hz, 240 v single and 415 v, three phase electricity supplies. The provision of such a conditioned network constitutes a further aspect of the invention.

The invention is not confined to the foregoing details and variations may be made thereto within the scope of the invention.

What is claimed is:

1. A network linking a plurality of premises, comprising:
   a section of broadband telecommunications network, and
   a plurality of electrical power cables each connected to a respective one of the premises for supplying mains electrical power thereto, and each being entirely external to said plurality of premises,
   each of said power cables also being connected to the section of broadband telecommunications network so that telecommunications signals are transmissible between the section of broadband telecommunications network and each of said power cables,
   wherein a telecommunications signal is transmissible at a carrier frequency greater than 1 MHz to and/or from said plurality of premises by being transmitted along the section of broadband telecommunications network and also along the respective power cable of each of said premises.

2. A network according to claim 1 further including satellite receiving means for receiving telecommunications signals from a satellite transmitter, wherein a telecommunications signal is transmissible from said satellite transmitter to said plurality of premises via said satellite receiving means, said section of broadband telecommunications network and said power cables.

3. A network according to claim 1, including a plurality of interface units, each of said interface units connecting one of said power cables to said section of broadband telecommunications network, each of said interface units including high pass filter means for allowing high frequency telecommunications signals to pass between said section of broadband telecommunications network and said power cable, and for preventing low frequency mains electrical power signals from passing therebetween.

4. A network according to claim 1, wherein said section of broadband telecommunications network includes any or all of fiber optic, twisted pair or co-axial cable.

5. A network linking a plurality of premises, comprising:
   a section of broadband telecommunications network,
   a plurality of electrical power cables each connected to a respective one of the premises for supplying mains electrical power thereto, and each being entirely external to said plurality of premises, and
   a plurality of interface units, each of said interface units connecting one of said power cables to said section of broadband telecommunications network, each of said interface units including a high pass filter for allowing high frequency telecommunications signals to pass between said section of broadband telecommunications network and said power cable, and for preventing low frequency mains electrical power signals from passing therebetween,
   wherein a telecommunications signal is transmissible at a carrier frequency greater than 1 MHz to and/or from said plurality of premises by being transmitted along the section of broadband telecommunications network and also along the respective power cable of each of said premises, and
   further including a satellite receiver for receiving telecommunications signals from a satellite transmitter, wherein a telecommunications signal is transmissible from said satellite transmitter to said plurality of premises via said satellite receiver, said section of broadband telecommunications network and said power cables,
   wherein said section of broadband telecommunications network includes any or all of fiber optic, twisted pair or co-axial cable.

6. A method of transmitting a telecommunications signal between a pair of buildings, including the steps of:
   (i) transmitting the signal at a carrier frequency greater than 1 MHz from a first building along an external power cable for supplying mains power to the first building, followed by
   (ii) transmitting the signal along a section of broadband telecommunications network, followed by
   (iii) transmitting the signal along a second external power cable for supplying mains electrical power to the second building.

7. A method of transmitting a telecommunications signal according to claim 6, wherein a telecommunications signal is transmitted from a satellite transmitter to said buildings by reception of said signal from said satellite transmitter by a satellite receiver coupled to said broadband telecommunications network for transmission of said telecommunications signal from said satellite receiver over said broadband telecommunications network to said external power cables to said buildings.

8. A method of transmitting a telecommunications signal to respective telecommunications apparatus in each of a plurality of buildings, including the steps of:
   (i) transmitting the telecommunications signal over a broadband telecommunications line paralleling an electrical power distribution line external to said buildings, said electrical power distribution line supplying power to each of said buildings via a respective power cable, said respective power cable being connected to said electrical distribution line at a branch point external to said each of said buildings;
   (ii) near the respective branch point connecting said respective power cable to said electrical power distribution line and at a location external to said each of said buildings, injecting said telecommunications signal from said broadband telecommunications line onto said respective power cable for conveying said telecommunications signal over said respective power cable to said each of said buildings; and
   (iii) near or in said each of said buildings, conveying said telecommunications signal from said respective power cable to said telecommunications apparatus in said each of said buildings.

9. A method as claimed in claim 8, which further includes a first telecommunications apparatus in a first building sending a telecommunications signal to a second telecommunications apparatus in a second building by signal transmission from the first telecommunications apparatus to a first power cable connecting the electrical power distribution line to said first building, followed by signal transmission from the first power cable to said broadband telecommunications line, followed by signal transmission from said broadband telecommunications line to a second electrical power cable connecting said electrical power distribution line to said second building, followed by signal transmission from said second electrical power cable to said second telecommunications apparatus.

10. A method as claimed in claim 8, wherein said telecommunications signal has a carrier frequency greater than 1 MHz.

11. A method as claimed in claim 8, which further includes transmitting said telecommunications signal from a satellite transmitter to a satellite receiver coupled to said broadband telecommunications line for transmission of said telecommunications signal from said satellite receiver over said broadband telecommunications line to said electrical power cables to said buildings.

12. A method of transmitting a telecommunications signal to respective telecommunications apparatus in each of a plurality of buildings, including the steps of:

(i) transmitting the telecommunications signal over a broadband telecommunications line, there being an electrical power distribution line external to said buildings, said electrical power distribution line supplying power to each of said buildings via a respective power cable, said respective power cable being connected to said electrical distribution line at a branch point external to said each of said buildings;

(ii) near the respective branch point connecting said respective power cable to said electrical power distribution line and at a location external to said each of said buildings, injecting said telecommunications signal from said broadband telecommunications line onto said respective power cable for conveying said telecommunications signal over said respective power cable to said each of said buildings; and (iii) near or in said each of said buildings, conveying said telecommunications signal from said respective power cable to said telecommunications apparatus in said each of said buildings.

13. A method as claimed in claim 12, which further includes a first telecommunications apparatus in a first building sending a telecommunications signal to a second telecommunications apparatus in a second building by signal transmission from the first telecommunications apparatus to a first power cable connecting the electrical power distribution line to said first building, followed by signal transmission from the first power cable to said broadband telecommunications line, followed by signal transmission from said broadband telecommunications line to a second electrical power cable connecting said electrical power distribution line to said second building, followed by signal transmission from said second electrical power cable to said second telecommunications apparatus.

14. A method as claimed in claim 12, wherein said telecommunications signal has a carrier frequency greater than 1 MHz.

15. A method as claimed in claim 12, which further includes transmitting said telecommunications signal from a satellite transmitter to a satellite receiver coupled to said broadband telecommunications line for transmission of said telecommunications signal from said satellite receiver over said broadband telecommunications line to said electrical power cables to said buildings.

16. A network linking a plurality of buildings, comprising:

a section of broadband telecommunications network, and an electrical power distribution line external to said buildings, said electrical power distribution line supplying power to each of said buildings via a respective power cable, said respective power cable being connected to said electrical distribution line at a branch point external to said each of said buildings;

near the respective branch point connecting said respective power cable to said electrical power distribution line and at a location external to said each of said buildings, each of said power cable also being connected to the section of broadband telecommunications network so that it is possible to inject said telecommunications signal from said broadband telecommunications line onto said respective power cable for conveying said telecommunications signal over said respective power cable to said each of said buildings and for conveying said telecommunications signal from said respective power cable to said telecommunications apparatus in said each of said buildings.

17. A network as claimed in claim 16, which further includes a first telecommunications apparatus in a first building for sending a telecommunications signal to a second telecommunications apparatus in a second building by signal transmission from the first telecommunications apparatus to a first power cable connecting the electrical power distribution line to said first building, followed by signal transmission from the first power cable to said broadband telecommunications line, followed by signal transmission from said broadband telecommunications line to a second electrical power cable connecting said electrical power distribution line to said second building, followed by signal transmission from said second electrical power cable to said second telecommunications apparatus.

18. A network as claimed in claim 17, wherein said telecommunications signal has a carrier frequency greater than 1 MHz.

19. A network as claimed in claimed in claim 18, which further includes a satellite transmitter to transmit said telecommunications signal to a satellite receiver coupled to said broadband telecommunications line for transmission of said telecommunications signal from said satellite receiver over said broadband telecommunications line to said electrical power cables to said buildings.

\* \* \* \* \*

(12) EX PARTE REEXAMINATION CERTIFICATE (8861st)
United States Patent
Brown

(10) Number: US 6,282,405 C1
(45) Certificate Issued: Feb. 21, 2012

(54) HYBRID ELECTRICITY AND TELECOMMUNICATIONS DISTRIBUTION NETWORK

(75) Inventor: Paul A. Brown, Kendal (GB)

(73) Assignee: Amperion, Inc., Andover, MA (US)

Reexamination Request:
No. 90/011,096, Jul. 15, 2010

Reexamination Certificate for:
Patent No.: 6,282,405
Issued: Aug. 28, 2001
Appl. No.: 08/727,505
Filed: Jan. 17, 1997

(22) PCT Filed: Apr. 20, 1995
(86) PCT No.: PCT/GB95/00893
§ 371 (c)(1),
(2), (4) Date: Jan. 17, 1997
(87) PCT Pub. No.: WO95/29536
PCT Pub. Date: Nov. 2, 1995

Related U.S. Application Data

(63) Continuation of application No. 08/347,427, filed on Nov. 29, 1994, now Pat. No. 5,684,450.

(30) Foreign Application Priority Data

Oct. 22, 1992 (GB) .......................................... 9222205.8
Oct. 22, 1992 (GB) ............................................. 9222205
Oct. 20, 1993 (GB) .............................. PCT/GB93/02163
Apr. 21, 1994 (GB) ............................................. 9407935

(51) Int. Cl.
*H02J 13/00* (2006.01)
*H04B 3/56* (2006.01)
*H04B 3/54* (2006.01)
*H04N 7/16* (2006.01)

(52) U.S. Cl. ............................... 725/79; 307/3; 455/402
(58) Field of Classification Search .................... None
See application file for complete search history.

(56) References Cited

To view the complete listing of prior art documents cited during the proceeding for Reexamination Control Number 90/011,096, please refer to the USPTO's public Patent Application Information Retrieval (PAIR) system under the Display References tab.

*Primary Examiner* — John M Hotaling, II

(57) ABSTRACT

A telecommunications network for linking a plurality of premises, comprising, typically, a fiber optic or coaxial cable, and a plurality of electrical power cables each connected to a respective one of the premises for supplying mains electrical power thereto. Each of the power cables is also connected to the fiber optic or coaxial cable so that telecommunications signals are transmissible between the fiber optic or coaxial cable and each of the power cables. A telecommunications signal is transmissible to the plurality of premises by being transmitted along the fiber optic or coaxial cable and subsequently along the respective power cable of each of the premises.

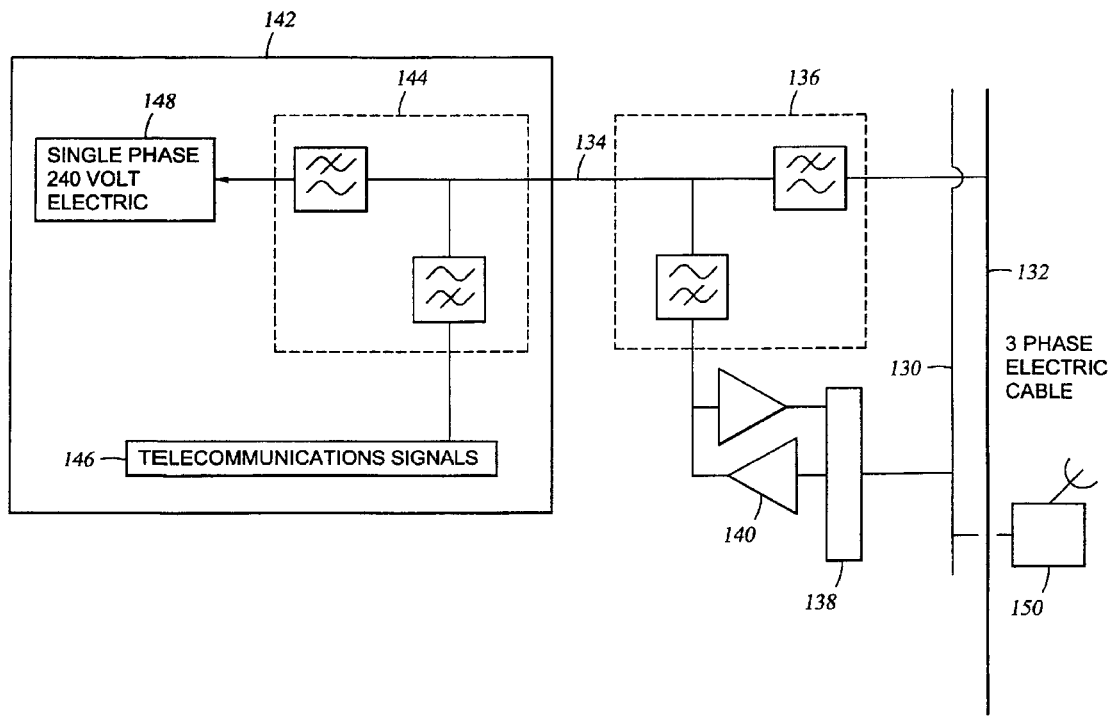

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 8-10, 12-14 and 16-18 is confirmed.

Claim 1 is determined to be patentable as amended.

Claims 3 and 4, dependent on an amended claim, are determined to be patentable.

Claims 2, 5, 7, 11, 15 and 19 were not reexamined.

1. A network linking a plurality of premises, comprising:

[a section of broadband telecommunications network, and a plurality of electrical power cables each connected to a respective one of the premises for supplying mains electrical power thereto, and each being entirely external to said plurality of premises, each of said power cables also being connected to the section of broadband telecommunications network so that telecommunications signals are transmissible between the section of broadband telecommunications network and each of said power cables, wherein a telecommunications signal is transmissible at a carrier frequency greater than 1 MHz to and/or from said plurality of premises by being transmitted along the section of broadband telecommunications network and also along the respective power cable of each of said premises]

*a section of a broadband telecommunications network; and*

*a plurality of electrical power cables connected along said broadband telecommunications network, wherein each cable is operatively connected to a respective one of said plurality premises for supplying mains electrical power thereto, wherein said each cable is entirely external to said plurality of premises, and wherein said each cable:*

*transmits a signal at a carrier frequency greater than 1 MHz from a first premise along an external power cable for supplying mains power to said first premise;*

*transmits said signal along said section of broadband telecommunications network; and*

*transmits said signal along a second external power cable for supplying mains electrical power to a second premise.*

* * * * *